United States Patent
Pietraski

(10) Patent No.: US 8,379,696 B2
(45) Date of Patent: Feb. 19, 2013

(54) METHOD AND APPARATUS FOR SWITCHING OPERATING MODES OF A RECEIVER

(75) Inventor: Philip J. Pietraski, Huntington Station, NY (US)

(73) Assignee: Interdigital Technology Corporation, Wilimgton, DE (US)

( * ) Notice: Subject to any disclaimer, the term of this patent is extended or adjusted under 35 U.S.C. 154(b) by 0 days.

(21) Appl. No.: 13/150,457

(22) Filed: Jun. 1, 2011

(65) Prior Publication Data

US 2011/0228819 A1    Sep. 22, 2011

Related U.S. Application Data

(63) Continuation of application No. 11/685,814, filed on Mar. 14, 2007, now Pat. No. 7,978,752.

(60) Provisional application No. 60/782,458, filed on Mar. 15, 2006.

(51) Int. Cl.
*H04B 1/00* (2006.01)

(52) U.S. Cl. ................. 375/152; 375/260

(58) Field of Classification Search .................. 375/146, 375/152, 222, 232, 260, 350, 351
See application file for complete search history.

(56) References Cited

U.S. PATENT DOCUMENTS

| | | | |
|---|---|---|---|
| 5,283,531 A | 2/1994 | Serizawa et al. | |
| 5,809,069 A | 9/1998 | Polley et al. | |
| 6,167,081 A | 12/2000 | Porter et al. | |
| 6,744,821 B1 | 6/2004 | Van Acker et al. | |
| 7,092,431 B2 * | 8/2006 | Maeda et al. | 375/144 |
| 2002/0024995 A1 | 2/2002 | Kim | |
| 2004/0042537 A1 * | 3/2004 | Frank | 375/152 |
| 2004/0091023 A1 * | 5/2004 | Chen et al. | 375/148 |
| 2004/0161029 A1 | 8/2004 | Malladi et al. | |
| 2005/0111539 A1 | 5/2005 | Tsuchiya | |

FOREIGN PATENT DOCUMENTS

| | | |
|---|---|---|
| EP | 0 415 897 | 3/1991 |
| EP | 0 615 347 | 9/1994 |
| EP | 1 182 836 | 2/2002 |
| EP | 1 331 777 | 7/2003 |
| EP | 1 755 297 | 2/2007 |
| WO | 02/093765 | 11/2002 |

* cited by examiner

*Primary Examiner* — Leon-Viet Nguyen
(74) *Attorney, Agent, or Firm* — Volpe and Koenig, P.C.

(57) ABSTRACT

In a wireless communication system, a method and apparatus switches operating modes of a receiver receiving data and operating in a first mode. The method comprises determining whether a criteria is met to switch the operating mode of the receiver. The operating mode of the receiver is switched from the first mode to a second mode if the criteria is met.

13 Claims, 2 Drawing Sheets

METHOD AND APPARATUS FOR SWITCHING OPERATING MODES OF A RECEIVER

CROSS REFERENCE TO RELATED APPLICATION

This application is a continuation of U.S. patent application Ser. No. 11/685,814 filed Mar. 14, 2007, which claims the benefit of U.S. Provisional Application No. 60/782,458, filed Mar. 15, 2006, which is incorporated herein by reference as if fully set forth.

FIELD OF INVENTION

The present invention is related to wireless communication systems. More particularly, the present invention is related to a method and system for switching operating modes of a receiver.

BACKGROUND

Equalizer based receivers typically provide enhanced performance over other types of receivers in many situations. For this reason, equalizer based receivers are often preferred over other types of receivers, such as RAKEs or matched filters (MFs). Unfortunately, this enhanced performance sometimes comes at a cost.

For example, equalizer based receivers are more complex and may have performance degradation under certain conditions. Additionally, equalizer based receivers typically consume more power than other types of receivers. In fact, in some cases the equalizer consumes more power than any other components.

It is not necessarily advantageous for a receiver to be always operating in an equalizer mode. Therefore, it would be beneficial if a method and apparatus existed that would switch a receiver from an equalizer operating mode to a different mode when the conditions warranted.

SUMMARY

The present invention is related to a method and apparatus for switching operating modes of a receiver. The method comprises determining whether a criteria is met to switch the operating mode of the receiver. The operating mode of the receiver is switched from the first mode to a second mode if the criteria is met.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
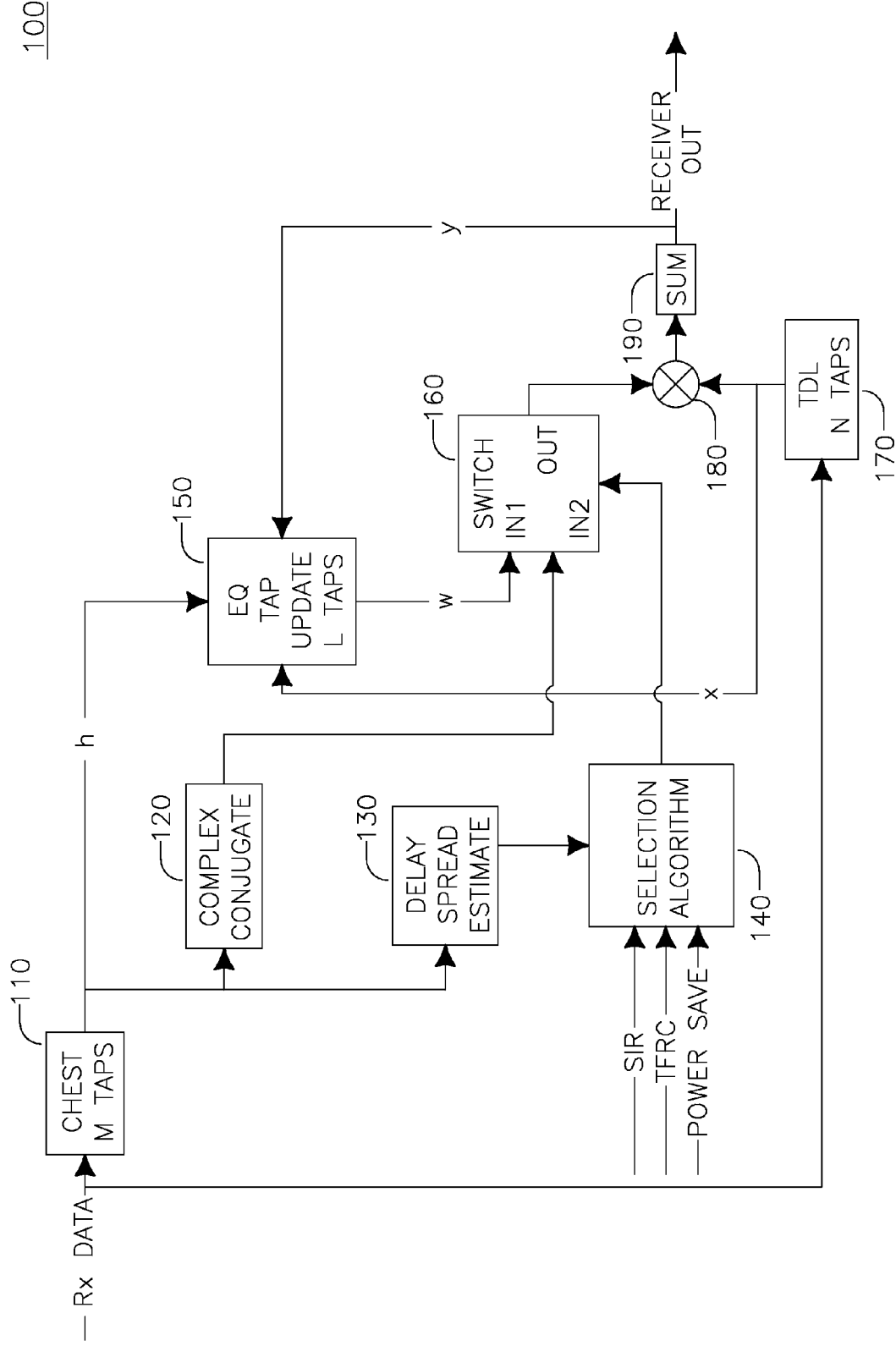
FIG. 1 is a functional block diagram of a receiver in accordance with the present invention.

FIG. 1 is a functional block diagram of a receiver 100 in accordance with the present invention. The receiver 100 includes a channel estimate (CHEST) block 110, having M taps, a complex conjugate block 120, a delay spread estimate block 130, a selection block 140 (or selection algorithm block), an equalization (EQ) tap update block 150, having L taps, a switch 160, having inputs (designated In1 and In2) and an output, a tapped delay line (TDL) block 170 having L taps, a multiplier 180, and a summation (SUM) block 190.

In the present example, the CHEST block 110 receives the input data sequence (Rx Data) and performs an operation on it to produce a vector "M" elements long that is as estimate of the channel impulse response (CIR), a channel estimate. There are various methods of performing a channel estimate including, but not limited to, linear techniques such as correlations with a known pilot sequence, non-linear techniques such as squelching small path estimates to reduce noise or decision directed methods, and adaptive techniques such as normalized least mean square (NLMS) or recursive least square (RLS) based channel estimates. The CHEST block 110 outputs a signal (h) to the EQ tap update block 150, the complex conjugate block 120 and delay spread estimate block 130.

The complex conjugate block 120 receives a vector of complex numbers as an input, and outputs a vector with each element being the complex conjugate of the corresponding input. The complex conjugate of the CIR may be used to realize a matched filter (MF) method and may be somewhat similar to that of a RAKE receiver, depending on the detail of the channel estimate. For example, if the elements of the channel estimate that do not correspond to a channel path location are squelched, the MF is very similar to a RAKE in performance. The complex conjugate block 120 outputs an MF signal to input In2 of the switch 160.

The delay spread estimate block 130 receives the channel estimate M length vector and computes a delay spread estimate. In one example, the delay spread may be calculated in accordance with the following equation:

$$\text{delay\_spread} = \sqrt{\sum_{m=1}^{M} d_m |p_m|^2} \ ; \qquad \text{Equation (1)}$$

where $d_m$ is the delay corresponding to the $m^{th}$ element of the channel estimation vector and $p_m$ is the value of the $m^{th}$ element in the channel estimation vector. The delay spread estimate block 130 outputs its signal to the selection block 140.

The selection block 140 receives available data to determine if it is appropriate or acceptable to switch the receiver to the lower power MF receive. Such information may include, but is not limited to, Signal to Interference Ratio (SIR), the estimated channel delay spread received from the delay spread estimate block 130, the aggressiveness of the transmission being received (computable from the transport format resource combination (TFRC) input, or from the data rate attempted), the energy left in the receiver's battery (power save input), and/or indication from the network that it is permitted to switch. The selection block 140 outputs a signal to the switch 160. The switch 160 also receives the signal (w) in the input In1 from the EQ tap update block 150.

The equalizer tap update block 150 generates the taps for the equalizer that are used when the receiver 100 operates as an advanced receiver. The output (w) is a vector of L elements. The inner product of the generated taps, w, and the TDL produce the equalizer output.

The switch block 160 receives either the equalizer taps or the conjugate of the channel estimate and forwards it on to an input of the multiplier 180. The multiplier 180 takes two vectors as inputs and computes the element-wise product to produce a third output vector. The elements of the output vector from 180 are all added up together in the SUM block 190 to produce either the equalizer or matched filter output, y, depending on which vector the switch 160 selected. In the case of adaptive equalizers, the output is fed back to the tap generation block. Where the MF is used and squelching was done in the channel estimate, the multiplications with zero elements may not need to be performed.

The TDL block 170 is preferably a shift register that receives the input data (Rx Data) and provides an output comprising a vector where the N elements of the vector are the last M values of the Rx Data signal. The TDL block 170 outputs a signal to the multiplier 180 and a signal (x) to the EQ tap update block 150. The multiplier 180 outputs a signal to the SUM block 190. The SUM block 190 outputs the receiver output signal (y), which is also a feedback to the EQ tap update block 150.

Figure 2:
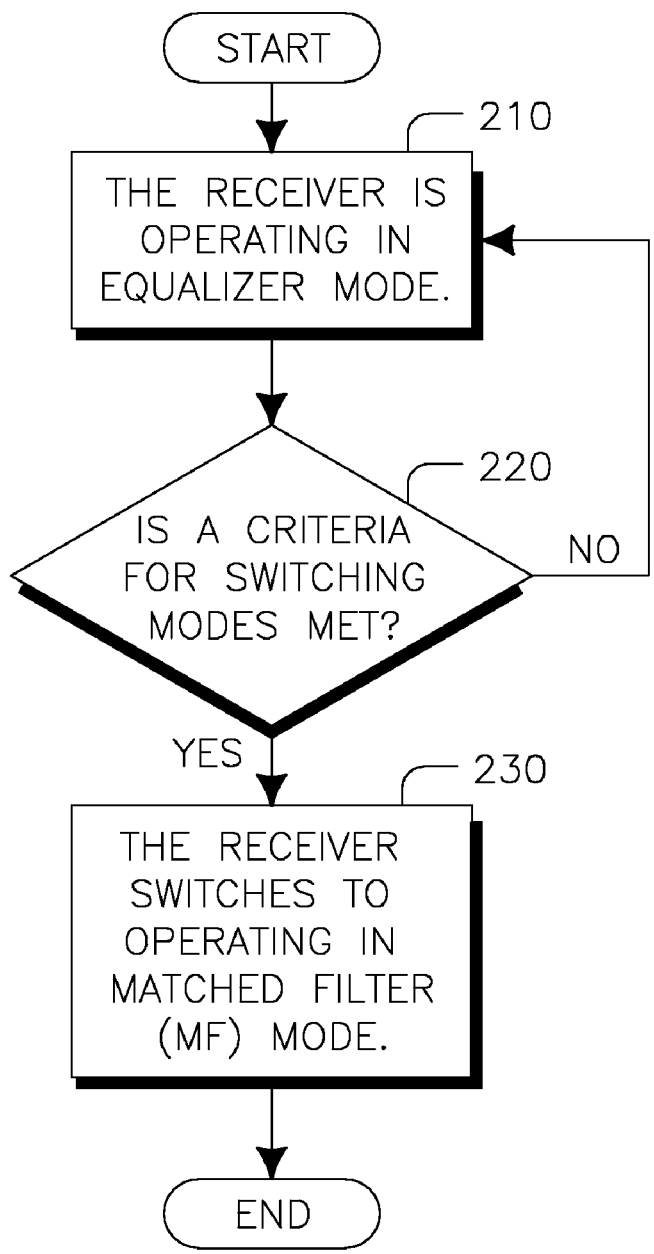
FIG. 2 is a flow diagram of a method for switching operating modes of the receiver of FIG. 1.

FIG. 2 is a flow diagram of a method 200 for switching operating modes of the receiver 100 of FIG. 1. In step 210, the receiver 100 is operating in equalizer mode. The receiver 100 then determines whether a criteria for switching modes is met (step 220). These may include when conditions do not permit the performance advantage of the equalizer mode, when conditions may indicate a preference for the MF operation, or when higher performance is not required. Under those circumstances, it may be beneficial to switch from equalizer operation to MF operation to save power or possibly to improve receiver performance.

For example, if a high data rate is requested, the SIR is high, the delay spread is low, and the battery life of the receiver 100 is good, then the criteria for switching modes is considered to not have been met and the receiver 100 continues to operate in equalizer mode (step 210). However, if for example, the battery life of the receiver 100 is low and/or the channel quality is excessive for the required data rate, then the receiver 100 switches to operating in MF mode (step 230). In this example, the decision to switch to the MF mode is made to save power. However, the decision to switch modes to the MF mode may also be made for performance reasons as described above, for example if the delay spread indicated that the channel consisted of essentially a single path.

When the receiver 100 is operating in the MF mode, all the computation in the EQ tap update block 150 may be stopped. This saves a considerable fraction of the receiver power. The CHEST block 110 may be enlarged to cover a larger window of M taps than the equalizer window of length L taps so that larger delay spread channel may be accommodated in the MF mode. The enlargement may either be permanent and only enabled in the MF mode, or may be dynamic if resources are available from the EQ tap update block 150 and reassigned to the CHEST block 110, without increasing gate-count complexity. The number of used taps in the TDL block 170, N, will either be set to L or M depending on the mode. The output of the receiver 100 may then be expressed as follows:

$$y(n) = \vec{v}_n^T \cdot \vec{x}(n), \quad \text{Equation (2)}$$

where $$\vec{v}_n = \begin{cases} \vec{w}_n & \text{if } EQmode \\ \vec{h}_n^* & \text{otherwise.} \end{cases}$$

The EQ tap update block 150 only runs when in the equalizer mode and computes the weights to be used when generating the output. The update equation is as follows:

$$\vec{w}_{n+1} = \alpha \cdot \vec{w}_n + \vec{\Delta}_n; \quad \text{Equation (3)}$$

where $$\vec{\Delta}_n = \frac{\mu}{2 \cdot \|\vec{x}(n)\|^2} \cdot (\vec{h}^*(n) - 2 \cdot \vec{x}^*(n) \cdot y(n)).$$

For equalizer structures that make use of a channel estimate (for example, channel estimation enhanced NLMS (CEN-LMS) or non-adaptive block equalizers), the mode switching can be done with little or no increase in design complexity. Although the aspects of the present invention have been described in terms of the CENLMS, they are also applicable to other compatible structures.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A wireless transmit/receive unit (WTRU) comprising:
   circuitry configured to switch from a deselected operating mode to a selected operating mode on a condition that predetermined criteria are met, wherein the switching is between a first operating mode and a second operating mode, and stopping operations performed by circuitry associated with the deselected operating mode to conserve power;
   a multiplier configured to produce a receiver output vector based on the selected operating mode; and
   a receiver configured to determine whether the predetermined criteria are met to switch from the first operating mode to the second operating mode, wherein the receiver is further configured to receive a signal to noise ratio (SIR) input, an indication of aggressiveness of the received transmission, a delay spread estimate, and a remaining battery energy indication, from which the predetermined criteria are selected, wherein the first and second operating modes are selected from a group consisting of an equalizer mode and a matched filter (MF) mode.

2. The WTRU of claim 1, wherein the first operating mode is an equalization mode and the second operating mode is a matched filter (MF) mode.

3. The WTRU of claim 1, wherein the output vector includes an equalizer output or a matched filter (MF) output.

4. The WTRU of claim 1, wherein the criteria for switching from the first operating mode to the second operating mode includes determining if a performance advantage exists between receiver operations in the first operating mode or the second operating mode.

5. The WTRU of claim 4, wherein on a condition that the performance advantage exists in the first operating mode, a switch to the second operating mode does not occur.

6. The WTRU of claim 4, wherein the performance advantage includes one or more of a measurement of a data rate, a measurement of a signal to interference ratio (SIR), a delay spread estimation or comparing a battery power level.

7. A method for switching operating modes of a receiver, the method comprising:
   determining whether predetermined criteria are met to switch from a first operating mode to a second operating mode, wherein the predetermined criteria are selected from a signal to noise ratio (SIR) input, an indication of aggressiveness of the received transmission, a delay spread estimate, and a remaining battery energy indication, wherein the first and second operating modes are selected from a group consisting of an equalizer mode and a matched filter (MF) mode;
   switching from a deselected operating mode to a selected operating mode on a condition that the predetermined criteria are met, wherein the switching is between the first operating mode and the second operating mode, and stopping operations performed by circuitry associated with the deselected operating mode to conserve power; and
   producing a receiver output vector based on the selected operating mode.

8. The method of claim 7, wherein the output vector includes an equalizer output or a matched filter (MF) output.

9. The method of claim 7 wherein the criteria for switching from the first operating mode to the second operating mode includes determining if a performance advantage exists between receiver operations in the first operating mode or the second operating mode.

10. The method of claim 9 wherein on a condition that the performance advantage exists in the first operating mode, a switch to the second operating mode does not occur.

11. The method of claim 9 wherein the performance advantage includes one or more of a measurement of a data rate, a measurement of a signal to interference ratio (SIR), a delay spread estimation or comparing a battery power level.

12. The method of claim 7 wherein the first operating mode is an equalization mode and the second operating mode is a matched filter (MF) mode.

13. The method of claim 7, further comprising:
   dynamically adjusting a number of taps of channel estimation process to accommodate the selected operating mode; and
   reassigning resources previously used by the circuitry of the deselected operating mode to the channel estimation process.

* * * * *